United States Patent
Bauchot et al.

(10) Patent No.: US 7,772,980 B2
(45) Date of Patent: Aug. 10, 2010

(54) METHOD AND SYSTEMS FOR LOCALIZING OBJECTS USING CAPACITIVELY COUPLED RFIDS

(75) Inventors: Frederic Bauchot, Saint-Jeannet (FR); Jean-Yves Clement, Saint-Jeannet (FR); Gerard Marmigere, Drap (FR); Joaquin Picon, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 11/733,369

(22) Filed: Apr. 10, 2007

(65) Prior Publication Data

US 2007/0241907 A1    Oct. 18, 2007

(30) Foreign Application Priority Data

Apr. 12, 2006  (EP)  .................................. 06300356

(51) Int. Cl.
G08B 13/14 (2006.01)
H04Q 5/22 (2006.01)
G06F 19/00 (2006.01)
G06F 3/12 (2006.01)
A47B 65/00 (2006.01)

(52) U.S. Cl. .............. 340/572.7; 340/572.8; 340/10.31; 340/10.34; 340/10.2; 235/385; 358/1.13; 211/43

(58) Field of Classification Search ............... 340/572.7
See application file for complete search history.

(56) References Cited

U.S. PATENT DOCUMENTS 5,063,380 A * 11/1991 Wakura ................. 340/825.49

(Continued)

FOREIGN PATENT DOCUMENTS

WO      WO01/35242 A2 * 12/2001

(Continued)

OTHER PUBLICATIONS

"A Basic Introduction to RFID Technology and Its Use in the Supply Chain", Laran RFID, Think RFID Technology, Jan. 2004, pp. 1-30.

(Continued)

*Primary Examiner*—George A Bugg
*Assistant Examiner*—Jack Wang
(74) *Attorney, Agent, or Firm*—Scully, Scott, Murphy & Presser, P.C.; William H. Steinberg, Esq (57) ABSTRACT

A method and system for localizing an object among a set of objects, each equipped with an improved RFID tag. The tag includes an RFID chip, an antenna, a visual indicator, an AC/DC converter, and at least a pair of conductive surfaces adapted for receiving power from an external source and for powering the electronic chip according to capacitive coupling. Each conductive surface of the pair is designed to form the half of a capacitor, the capacitor being formed when the electronic tag and a similar electronic tag are attached to a neighboring adjacent object. To localize an object, an RFID reader is used, fed with the identifier of the object to be localized. All the capacitively coupled RFID, in the RFID reader range, receive a reading trigger that carries the identifier. The RFID tag compares the received identifier with its own identifier and if they match, then the capacitively coupled RFID reacts by providing a visual indicator; otherwise, if they do not match, the capacitively coupled RFID does not react.

15 Claims, 3 Drawing Sheets

U.S. PATENT DOCUMENTS

| | | | |
|---|---|---|---|
| 5,217,122 A * | 6/1993 | Martinez | 211/43 |
| 5,424,858 A * | 6/1995 | Gillotte | 398/108 |
| 6,265,977 B1 * | 7/2001 | Vega et al. | 340/572.7 |
| 6,384,727 B1 * | 5/2002 | Diprizio et al. | 340/572.7 |
| 6,693,539 B2 | 2/2004 | Bowers et al. | |
| 6,768,419 B2 * | 7/2004 | Karel et al. | 340/572.4 |
| 2002/0196126 A1 * | 12/2002 | Eisenberg et al. | 340/10.2 |
| 2003/0231106 A1 * | 12/2003 | Shafer | 340/10.34 |
| 2005/0077353 A1 * | 4/2005 | Oishi et al. | 235/385 |
| 2005/0237198 A1 * | 10/2005 | Waldner et al. | 340/572.7 |
| 2006/0017950 A1 * | 1/2006 | Ikegami et al. | 358/1.13 |
| 2007/0257799 A1 * | 11/2007 | Bauchot et al. | 340/572.1 |
| 2009/0121843 A1 * | 5/2009 | Bauchot et al. | 340/10.31 |

OTHER PUBLICATIONS

Shepard, "RFID Radio Frequency Identification", McGraw-Hill, pp. viii-xvi.

* cited by examiner

METHOD AND SYSTEMS FOR LOCALIZING OBJECTS USING CAPACITIVELY COUPLED RFIDS

FIELD OF THE INVENTION

The present invention relates generally to the methods and systems for localizing objects and more specifically to a method and systems for localizing an object among a set of stacked similar objects equipped with capacitively coupled RFID tags.

BACKGROUND OF THE INVENTION

In the previous millennium, mediatheques were merely libraries with shelves full of books. Finding a book in a library was not always an easy task to do, but was nevertheless facilitated by it being distinguished according to various formats, colors, sizes and materials. So discriminating between a cook book, a dictionary, a comic book, an atlas, a schoolbook, a picture book, a prayer book, a cashbook, an account book, was not so difficult. With the recent explosion of electronic media, it is today quite common to find all these different books recorded on a common media following worldwide standards in terms of physical form factor, size and even colors. Either CD's or DVD's can record any type of information, not only text and images as books did, but also sound and video. The result is that state of the art mediatheques are now with shelves full of objects that follow or not the same format. Finding a given object within such a mediatheque becomes much more demanding as it was in the past.

To overcome this difficulty, the RFID technology provides an interesting capability allowing to uniquely identify an RFID tag, and subsequently the object it is attached to. For example, U.S. Pat. No. 6,693,539 discloses an article inventory control system for articles, such as books, using Radio Frequency Identifier (RFID) tags attached to the articles. Each tag has a unique identification or serial number for identifying the individual article. An inventory database tracks all of the tagged articles and maintains circulation status information for each article. Articles are checked out of the library using a patron self-checkout system. Checked out articles are returned to the library via patron self-check in devices. The shelves are periodically scanned with a mobile RFID scanner for updating inventory status.

The current RFID technology allows to assign a unique identifier to an RFID tag, so that this tag can be uniquely identified when read by an RFID reader. Establishing a one-to-one relationship between the RFID tag and the object it is attached to, allows consequently to uniquely identify a given object among a set of objects. Thus, an obvious solution for localizing objects in shelves consists in sticking an RFID tag onto each object, to associate each object with the attached RFID tag, and then to read the RFID tag identifier by implementing an RFID reader. To make such a solution affordable, the RFID tags have to be inexpensive, robust and thin, so that only passive RFID tags are considered. This limitation brings a cumbersome constraint as the reading range of passive RFID tags is quite limited, typically few inches. In order to locate a given object within a set of shelves, the reader will have to pass close to each shelf, scanning all of its width. This either asks for a tedious and precise manual operation, or to put in place an expensive robot. Active RFID tags do not suffer from this short reading range, but are unfortunately not well suited, due to their price and more important due to the fact that they have to include a power source (like a battery) bringing stringent form factor constraints.

Therefore, there is a need for innovative RFID tags allowing long reading range while being equivalent in terms of size, form factor, and price to the passive RFID tags, for identifying objects in mediatheques, libraries, book-stores, or any place where objects (e.g., books, CDs, DVDs, etc) may be stored in a stackable arrangement.

SUMMARY OF THE INVENTION

Thus, it is a broad object of the invention to remedy the shortcomings of the prior art as described here above.

It is another object of the invention to provide improved powerless RFID tags providing long reading ranges.

It is a further object of the invention to provide improved RFID tags having embedded visual indication means.

It is a further object of the invention to provide improved low cost RFID tags providing long reading ranges.

It is still a further object of the invention to provide improved RFID tags of which the power scheme is based on capacitive coupling for receiving power from external sources.

The accomplishment of these and other related objects is achieved by an electronic tag adapted to be capacitively coupled with at least one similar electronic tag, the electronic tag comprising an RFID chip coupled to an antenna, an AC/DC converter for supplying power to the tag, and one pair of conductive surfaces for connection with the AC/DC converter, a conductive surface of the pair of conductive surfaces being adapted for receiving power from an external source and for powering the RFID chip, each conductive surface of the pair of conductive surfaces being designed to form a half of a capacitor, the capacitor being formed when the conductive surface of the electronic tag is aligned with a like conductive surface of the similar electronic tag when the electronic tags are attached to neighboring objects, wherein the formed capacitor functions to couple power to an electronic tag of a neighboring object.

According to a further embodiment of the invention, there is provided a system for identifying an object of a plurality of objects comprising:

for each object, an attached electronic tag adapted to be capacitively coupled with at least one similar electronic tag attached to an adjacent object, the electronic tag comprising:

an RFID chip coupled to an antenna, an AC/DC converter for supplying power to the tag, and a first pair of conductive surfaces for connection with the AC/DC converter, a conductive surface of the first pair of conductive surfaces being adapted for receiving power from an external source and for powering the RFID chip, each conductive surface of the first pair of conductive surfaces being designed to form a half of a capacitor, the capacitor being formed when the conductive surface of the electronic tag is positioned adjacent a like conductive surface of the similar electronic tag when the electronic tags are attached to neighboring objects, wherein the formed capacitor functions to couple power to an electronic tag of a neighboring object; and, a visual indication means coupled to the RFID chip for indicating when an electronic tag reading device has identified an object the electronic tag is attached to, wherein the visual indication means is adapted to be activated when data received by the electronic tag matches data stored in the RFID chip.

Yet according to a further embodiment of the invention, there is provided a method for localizing an object among a set of objects in a stacked arrangement comprising:

a) providing for each object, an electronic tag adapted to be capacitively coupled with at least one similar electronic tag attached to an adjacent object, the electronic tag comprising:
   an RFID chip coupled to an antenna,
   an AC/DC converter for supplying power to the tag, and
   a first pair of conductive surfaces for connection with the AC/DC converter, a conductive surface of the first pair of conductive surfaces being adapted for receiving power from an external source and for powering the RFID chip, each conductive surface of the first pair of conductive surfaces being designed to form a half of a capacitor, the capacitor being formed when the conductive surface of the electronic tag is positioned adjacent a like conductive surface of the similar electronic tag when the electronic tags are attached to neighboring objects, wherein the formed capacitor functions to couple power to an electronic tag of a neighboring object; and,
   a visual indication means coupled to the RFID chip for indicating the identification the object the electronic tag is attached to;
b) implementing an electronic tag reading device for providing data to the RFID chip;
c) comparing received data from the electronic tag with predetermined identification data stored at the RFID chip; and,
d) activating the visual indication means when data received by the electronic tag matches data stored in the RFID chip.

Further advantages of the present invention will become apparent to the ones skilled in the art upon examination of the drawings and detailed description. It is intended that any additional advantages be incorporated herein.

BRIEF DESCRIPTION OF THE DRAWINGS

The objects, features and advantages of the present invention will become apparent to one skilled in the art, in view of the following detailed description taken in combination with the attached drawings, in which:

FIG. 3, comprising

DETAILED DESCRIPTION OF THE PREFERRED EMBODIMENTS

As mentioned above, the proposed invention aims to address the problem of identifying a mediatheque object, with an innovative RFID tag that allows long reading range while being equivalent in terms of size, form factor and price to the passive RFID tags. In the following description, this innovative RFID tag is referred to as the "Capacitively Coupled RFID tag", or CCRFID for short.

RFID Systems

The core of any RFID system is the 'Tag' or 'Transponder', which can be attached to or embedded within objects, wherein data can be stored. An RFID reader, generically referred to as reader in the following description, sends out a radio frequency signal to the RFID tag that broadcasts back its stored data to the reader. The system works basically as two separate antennas, one on the RFID tag and the other on the reader. The read data can either be transmitted directly to another system like a host computer through standard interfaces, or it can be stored in a portable reader and later uploaded to the computer for data processing. An RFID tag system works effectively in environments with excessive dirt, dust, moisture, and/or poor visibility. It generally overcomes the limitations of other automatic identification approaches.

Several kinds of RFID, such as piezoelectric RFID and electronic RFID, are currently available. For example, passive RFID tags do not require battery for transmission since generally, they are powered by the reader using an induction mechanism (an electromagnetic field is emitted by the reader antenna and received by an antenna localized on the RFID) tag). This power is used by the RFID tag to transmit a signal back to the reader, carrying the data stored in the RFID tag. Active RFID tags comprise a battery to transmit a signal to a reader. A signal is emitted at a predefined interval or transmit only when addressed by a reader.

When a passive High Frequency (HF) RFID tag is to be read, the reader sends out a power pulse e.g., a 134.2 KHz power pulse, to the RFID antenna. The magnetic field generated is 'collected' by the antenna in the RFID tag that is tuned to the same frequency. This received energy is rectified and stored on a small capacitor within the RFID tag. When the power pulse has finished, the RFID tag immediately transmits back its data, using the energy stored within its capacitor as its power source. Generally, 128 bits, including error detection information, are transmitted over a period of 20 ms. This data is picked up by the receiving antenna and decoded by the reader. Once all the data has been transmitted, the storage capacitor is discharged, resetting the RFID tag to make it ready for the next read cycle. The period between transmission pulses is known as the 'sync time' and lasts between 20 ms and 50 ms depending on the system setup. The transmission technique used between the RFID tag and the reader is Frequency Shift Keying (FSIC) with transmissions generally comprised between 124.2 kHz and 134.2 kHz. This approach has comparatively good resistance to noise while also being very cost effective to implement. Many applications require that RFID tag attached to objects be read while traveling at specific speeds by a readout antenna.

RFID tags can be read-only, write-once, or read-write. A read-only RFID tag comprises a read-only memory that is loaded during manufacturing process. Its content can not be modified. The write-once RFID tags differ from the read-only RFID tags in that they can be programmed by the end-user, with the required data e.g., part number or serial number. The read-write RFID tags allow for full read-write capability, allowing a user to update information stored in a tag as often as possible in the limit of the memory technology. Generally, the number of write cycles is limited to about 500,000 while the number of read cycles is not limited. A detailed technical analysis of RFID tag is disclosed e.g., in REID (McGraw-Hill Networking Professional) by Steven Shepard, edition Hardcover.

Figure 1:
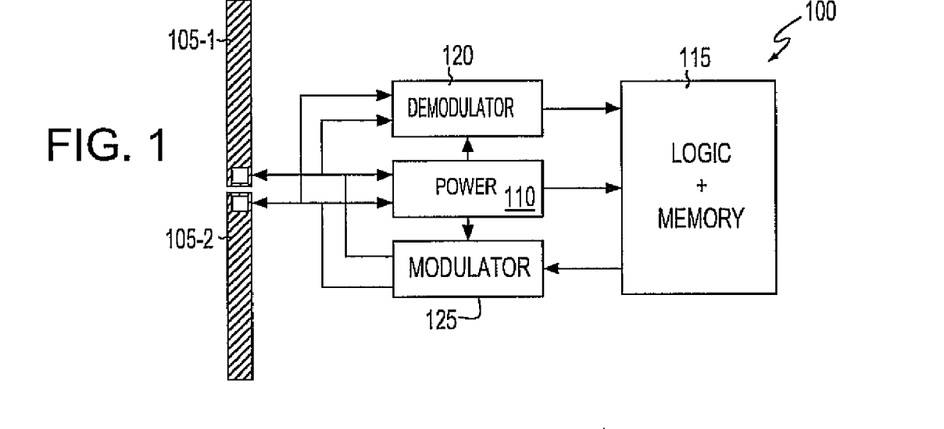
FIG. 1 depicts an example of the architecture of a passive RFID tag.

FIG. 1 depicts an example of the architecture of a passive HF or Ultra High Frequency (UHF) RFID tag 100. As shown, the dipole antenna comprising two parts 105-1 and 105-2 is connected to a power generating circuit 110 that provides current from received signal to the logic and memory circuit 115, to the demodulator 120, and to the modulator 125. The input of demodulator 120 is connected to the antenna (105-1 and 105-2) for receiving the signal and for transmitting the received signal to the logic and memory circuit 115, after having demodulated the received signal. The input of modulator 125 is connected to the logic and memory circuit 115 for receiving the signal to be transmitted. The output of modulator 125 is connected to the antenna (105-1 and 105-2) for transmitting the signal after it has been modulated in modulator 125.

The architecture of a semi-passive RFID tag is similar to the one represented on FIG. 1, the main difference being the presence of a power supply that allows it to function with much lower signal power levels, resulting in greater reading distances. Semi-passive tags do not have an integrated transmitter contrarily to active tags that comprise a battery and an active transmitter allowing them to generate high frequency energy and to apply it to the antenna.

As disclosed in "A basic introduction to RFID technology and its use in the supply chain", White Paper, Laran RFID, when the propagating wave from the reader collides with tag antenna in the form of a dipole, part of the energy is absorbed to power the tag and a small part is reflected back to the reader in a technique known as back-scatter. Theory dictates that for the optimal energy transfer, the length of the dipole must be equal to half the wave length, or $\lambda/2$. Generally, the dipole is made up of two $\lambda/4$ lengths. Communication from tag to reader is achieved by altering the antenna input impedance in time with the data stream to be transmitted. This results in the power reflected back to the reader being changed in time with the data i.e., it is modulated.

Figure 2A:
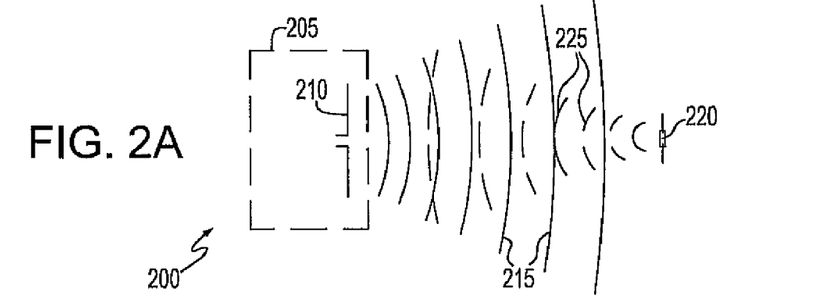
FIG. 2a depicts an RFID system with a reader having an antenna and an RFID tag having a dipole antenna; and, FIG. 2b depicts the signal emitted by the antenna of the reader and the modulated signal reflected by the RFID tag.
Figure 2B:
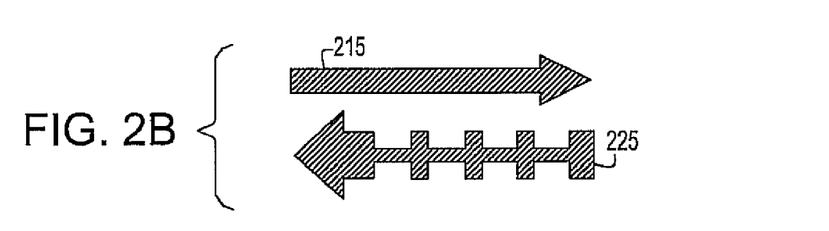

FIG. 2, comprising FIGS. 2a and 2b, shows an RFID system 200. As depicted on FIG. 2a, RFID system 200 comprises a reader 205 having an antenna 210. The antenna 210 emits a signal 215 that is received by an RFID tag 220. Signal 215 is reflected in RFID tag 220 and re-emitted as illustrated with dotted lines referred to as 225. FIG. 2b illustrates the signal 215 emitted by the antenna 210 of the reader 205 and the signal 225 reflected by the RFID tag 220. As shown on FIG. 2b, the reflected signal 225 is modulated. Capacitively coupled RFID tags for identifying objects in shelves RFID tags are autonomous electronic devices of which data can be accessed without any physical contact. By providing an internal power source, the reading distance of active or semi-passive RFID tags is greater than the one of passive RFID tag receiving power from their antenna. However, active or semi-passive RFID tags present drawbacks due to the internal power source that increases costs and reduces life cycle.

According to the invention, the architecture of active or semi-passive RFID tags is combined with external power sources, offering the advantages of the active or semi-passive RFID tags without the drawbacks resulting from the internal power source.

The main characteristics of the CCRFID tag are, long reading range, typically up to 10 meters;

visual identification of a targeted CCRFID tag, by implementing an imbedded tiny LED;

convenient form factor allowing to stick to or imbed the CCRFID tag in the objects;

low production costs; and, power scheme based on capacitive coupling, enabled by proper stacking of CCRFID.

Figure 3A:
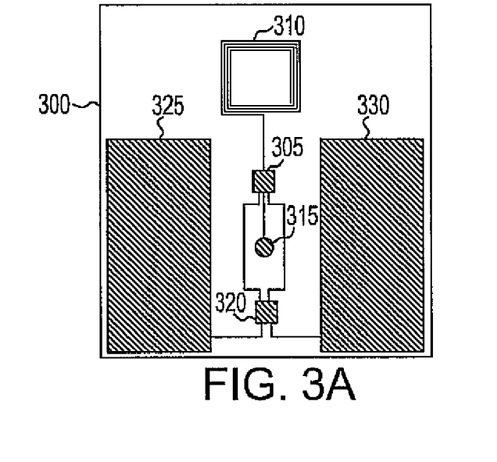
FIGS. 3a and 3b, depicts the capacitively coupled RFID tag of the invention.
Figure 3B:
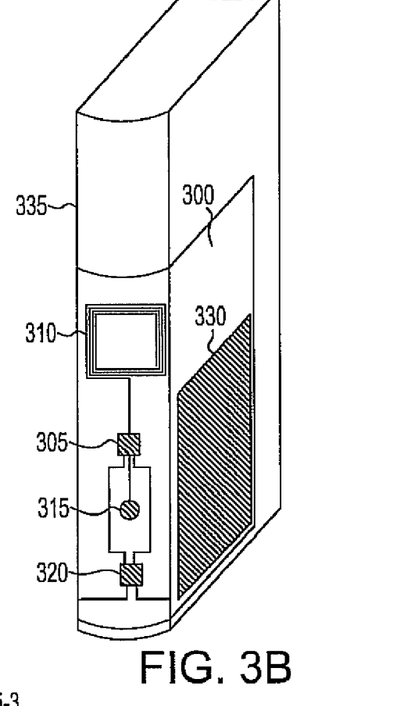

FIG. 3, comprising FIGS. 3a and 3b, illustrates the CCRFID tag. FIG. 3a depicts the CCRFID tag itself while FIG. 3b shows the spine of a book on which a CCRFID tag is attached to.

As illustrated on FIG. 3a, the CCRFID 300 comprises an RFID chip 305, an antenna 310, a Light Emitting Diode (LED) 315, or any equivalent lighting device, an AC/DC converter 320, and two conductive surfaces 325 and 330. The two conductive surfaces 325 and 330 allow to receive and transmit power from an external source (not represented) according to a capacitive coupling scheme, each conductive surface acting as an electrode of a capacitor. The alternating current received through conductive surfaces 325 and 330 is converted to direct current in AC/DC converter 320 for powering the RFID chip 305. RFID chip 305 is connected to antenna 310 to receive data and/or control commands. LED 315 is controlled by RFID chip 305 so that it can be powered upon conditions determined by received instructions and data stored therein. For example, if the received data match the stored data, the LED is powered during a predetermined delay.

Conductive surfaces 325 and 330 are arranged in such a way so that the conductive surface 325 of a first CCRFID is aligned to the conductive surface 330 of a second CCRFID when these two CCRFIDs are attached to stacked objects, as described below by reference to FIG. 4.

FIG. 3b shows an example where a CCRFID 300 is attached to a book 335. CCRFID 300 is preferably attached on the spine of the book 335 so that LED 315 is visible when the book is stacked with others and so that power can be received by capacitive coupling with neighboring books.

Figure 4:
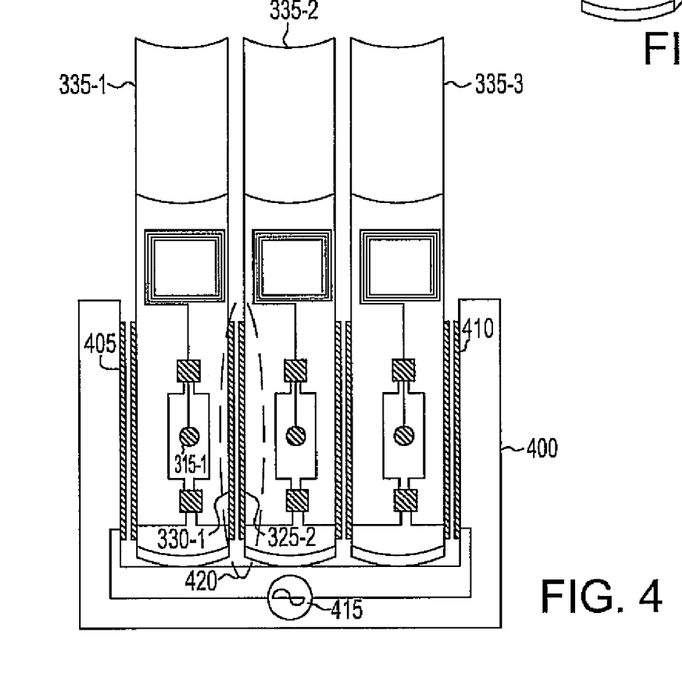
FIG. 4 illustrates several objects, e.g., books, each equipped with a capacitively coupled RFID tag according to the invention, and arranged properly in a shelf according to the principles of the invention.

With reference to the FIG. 4, a set of three books 335-1 to 335-3 are settled in the shelf 400, side-by-side. Each book, generically referred to as 335, is equipped with a CCRFID as described above by reference to FIG. 3, CCRFID 300-1 is stuck on book 335-1, CCRFID 300-2 is stuck on book 335-2, and so on. According to this arrangement, the set of LEDs of the CCRFID e.g., LED 315-1, are aligned on a row, so that any CCRFID tag identified by a reader will light it for being easily identified. This row of books sits in a shelf 400 comprising two conductive surfaces 405 and 410 which receive power from an external power source 415 generating alternating current. These conductive surfaces 405 and 410, aligned with the conductive surfaces of the CCRFIDs, allow to power the CCRFIDs according to capacitive coupling. For example, the capacitive coupling between books 335-1 and 335-2 is done according to capacitor 420. The electrodes of capacitor 420 consists of the conductive surface 330-1 of the CCRFID attached to the book 335-1 and of the conductive surface 325-2 of the CCRFID attached to the book 335-2. The dielectric of the capacitor 420 corresponds to the air film existing between the conductive surfaces 330-1 and 325-2. In the embodiments however, each of the conductive surfaces of the tag can be laminated with a dielectric material including, but not limited to: plastics films (Mylar, Polyester, Polypropylene, Polysulfone, Polystyrene, Polycarbonate, Teflon or even paper, ceramic or mica.

In a further alternate embodiment, a mechanical apparatus may be provided at the tag that prevents the conductive surfaces of respective tags attached to adjacent objects to touch each other thereby ensuring an air dielectric.

Figure 5:
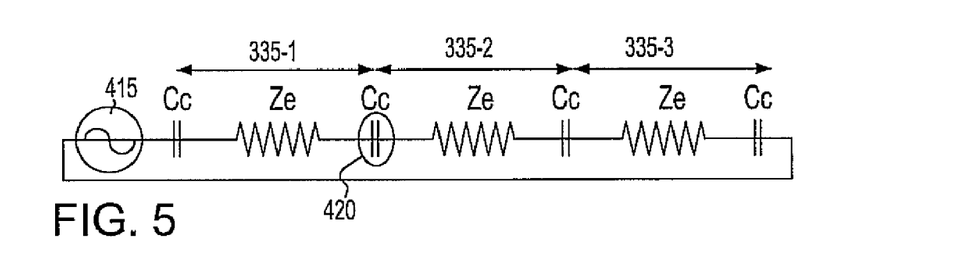
FIG. 5 depicts an electrical representation of the arrangement depicted in FIG. 4.

FIG. 5 is an electrical representation of the arrangement described on FIG. 4. As depicted, the CCRFID attached to a book can be represented as two half capacitors connected with a resistor having an impedance Ze. When two books are settled side-by-side, the neighboring half capacitors of the two books form a capacitor e.g., capacitor 420, having a capacity Cc. An equivalent capacitor is formed between the right-side book and the shelf and the left-side book and the shelf.

The capacity is determined according to The following relation, $$C = \epsilon_0 \epsilon_r S/e$$

wherein, $\epsilon_0$ is the electrostatic permittivity of vacuum or free space, $\epsilon_0 = 8.85 \cdot 10^{-12}$ As/Vm;

$\epsilon_r$ is the dielectric coefficient, $\epsilon_r \approx 1$ for air;

S is the surface of the capacitor electrodes, given in square meters; and, e is the dielectric thickness, given in meter.

Considering electrodes of 0.06 m×0.06 m, and a dielectric thickness of 0.001 m, the capacity Cc is, $$Cc = 8.85 \cdot 10^{-12} \times 1 \times 36 \cdot 10^{-4} / 10^{-3} = 31.86 \text{ pF}$$

Considering a power supply delivering 100 KHz voltage supply, the impedance of the capacitor is, $$Ze = 1/(Cc \cdot 2\pi F)$$

wherein Cc is the capacity of the capacitor and F is the power voltage frequency, thus, $$Ze = 1/(32 \cdot 10^{12} \cdot 2 \cdot 3.14 \cdot 10^{-5}) = 50 \text{ k}\Omega$$

Considering a supply voltage of 24V and twenty five books in a shelf this means that a voltage drop of 0.96V (24/25) is allowed per CCRFID. Therefore, the current in each CCRFID would be 19.2 μA (U/R=0.96/50,000) and the maximum power that could be used in each CCRFID would be 18 μW (U×1=0.96×19.2 $10^{-6}$). Since a typical RFID chip needs about 5 μW with a power supply of 1V, this shows that a capacitive coupling provides enough power for the CCRFIDs. Furthermore, it should be noticed that RFID chips can be improved to reduce power consumption.

Since the current required for powering the CCRFIDs is relatively low, the power generator is preferably a high impedance electrostatic generator. For example, respecting the current drop regulations like EN60065 or EN60335 of 100 μA to 700 μA for a class 1 equipment in a residential environment, the internal impedance of a 50V generator can be of 5000 kΩ for a 100 μA current at a given frequency.

With the arrangement described on FIG. 4, the identification of a given book is easy. The user must first select the book to be searched. Then, he/she must identify the associated identifier, according to some defined relationship between a book and an identifier. Such a relationship is beyond the scope of the present invention, but it typically corresponds, in a preferred embodiment of the present invention, to an association with an Electronic Product Code (EPC). Then the user utilizes an RFID reader, fed with the identifier, so that all CCRFID in range receive a reading trigger. Each CCRFID receiving this reading trigger carrying the identifier compares the received identifier with its own one. If they do not match, the CCRFID does not react. If they match, then the CCRFID reacts by lighting its LED. This allows the user to immediately identify the searched book.

Alternate Embodiments

Figure 6:
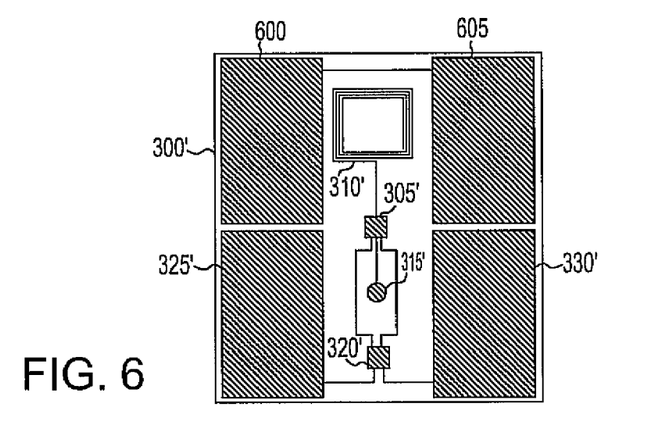
FIGS. 6 and 7 depict an alternative embodiment of the design of the capacitively coupled RFID tags according to the invention.

FIG. 6 illustrates a further example of CCRFID design. Turning to FIG. 6, the CCRFID 300' comprises an RFID chip 305', an antenna 310', a LED 315', or any equivalent lighting device, an AC/DC converter 320', and two conductive surfaces 325' and 330'. The CCRFID 300' further comprises two additional conductive surfaces 600 and 605, electrically connected. The two conductive surfaces 325 and 330' allow to receive and transmit power from an external source (not represented) according to a capacitive coupling scheme, each conductive surface acting as an electrode of a capacitor. The alternating current received through conductive surfaces 325' and 330' is converted to direct current in AC/DC converter 320' to power the RFID chip 305'. REID chip 305' is connected to antenna 310' to receive data and/or control commands. LED 315' is controlled by RFID chip 305' so that it can be powered upon conditions determined by received instructions and data stored therein. For example, if the received data match the stored data, the LED is powered during a predetermined delay. The two conductive surfaces 325' and 330' form a current loop, still using a capacitive coupling scheme, allowing to connect the power source on one side of the row of objects to which CCRFIDs are attached, as illustrated on FIG. 7.

Figure 7:
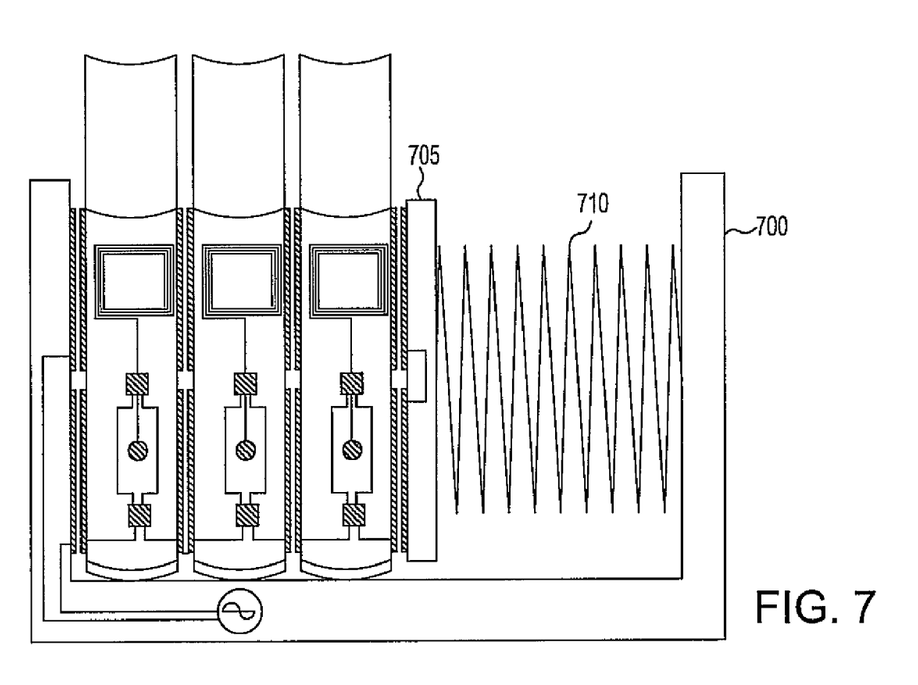

With reference to the FIG. 7, a set of three books are settled in the shelf 700, side-by-side. A CCRFID as the one described by reference to FIG. 6 is attached to each of these books. Shelf 700 is adapted to receive more than three books and so, shelf 700 comprises a mobile part 705 maintaining the books side-by-side, by a spring 710. It is understood that other mechanisms besides spring loaded mechanisms may be used to maintain the books in a side-by-side or stackable arrangement. Mobile part 705 comprises two conductive surfaces, electrically connected, arranged in such a way so as to form two capacitors with the two conductive surfaces of the CCRFID attached to the neighboring book, the electrically connected two conductive surfaces forming the current closing loop. According to this arrangement, the set of LEDs of the CCRFID are aligned in a row, so that any CCRFID tag identified by a reader will light when identified by the reader. This row of books sits in the shelf 700 comprising two conductive surfaces, located on the left side, which receive power from an external power source generating alternating current. These conductive surfaces, aligned with the conductive surfaces of the neighboring CCRFID, allow to power the CCRFIDs according to capacitive coupling. If a book is pulled out of the shelf, then the remaining book's, if any, can still be powered due to the propagation of energy as enabled by the mobile part 705.

Alternately, CCRFIDs of the type described by reference to FIG. 3 can be attached to the books settled in the shelf 700. In such case, the mobile part 705 comprises a single conductive surface connected to one terminal of the power source. The second terminal of the power source is connected to a single conductive surface located on the left side of the shelf, as shown on FIG. 4.

Without departing from the spirit of the proposed invention, some enhancements can be proposed along the following points:

- the pile of books can be arranged vertically so that if a book is pulled out of the vertical pile, then the remaining book's, if any, will still be powered due to the propagation of energy from the base up to the top book;
- the proposed layout and the number of the contacts may vary, provided that capacitive coupling is maintained; and,
- the power source can be located in the shelves, for instance using battery.

Naturally, in order to satisfy local and specific requirements, a person skilled in the art may apply to the solution described above many modifications and alterations all of which, however, are included within the scope of protection of the invention as defined by the following claims.

Having thus described our invention, what we claim as new, and desire to secure by Letters Patent is:

1. An electronic tag adapted to be capacitively coupled with at least one similar electronic tag, said electronic tag comprising an RFID chip coupled to an antenna, an AC/DC converter for supplying power to said tag, and one pair of conductive surfaces for connection with said AC/DC converter, a conductive surface of said pair of conductive surfaces being adapted for receiving power from an external source and for powering said RFID chip, each conductive surface of said pair of conductive surfaces being designed to form a half of a capacitor, the capacitor being formed when the conductive surface of said electronic tag is aligned with a like conductive surface of said similar electronic tag when said electronic tags are attached to neighboring objects, wherein said formed capacitor functions to couple power to an electronic tag of a neighboring object.

2. The electronic tag as claimed in claim 1, further comprising: a second pair of conductive surfaces, said second pair of conductive surfaces being electrically connected, each conductive surface of said second pair of conductive surfaces adapted to form a half of a capacitor, the capacitor being formed when a conductive surface of said second pair is positioned adjacent a like conductive surface of said second pair of said similar electronic tag when said electronic tags are attached to neighboring objects.

3. The electronic tag as claimed in claim 1, further comprising visual indication means coupled to said RFID chip, and adapted to indicate when an electronic tag reader has identified an object said electronic tag is attached to.

4. The electronic tag as claimed in claim 3 wherein said visual indication means is adapted to be activated when data received by said antenna of said electronic tag matches data stored in said RFID chip.

5. A system for identifying an object of a plurality of objects comprising:
 for each object, an attached electronic tag adapted to be capacitively coupled with at least one similar electronic tag attached to an adjacent object, said electronic tag comprising:
 an RFID chip coupled to an antenna,
 an AC/DC converter for supplying power to said tag, and
 a first pair of conductive surfaces for connection with said AC/DC converter, a conductive surface of said first pair of conductive surfaces being adapted for receiving power from an external source and for powering said RFID chip, each conductive surface of said first pair of conductive surfaces being designed to form a half of a capacitor, the capacitor being formed when the conductive surface of said electronic tag is positioned adjacent a like conductive surface of said similar electronic tag when said electronic tags are attached to neighboring objects, wherein said formed capacitor functions to couple power to an electronic tag of a neighboring object; and,
 a visual indication means coupled to said RFID chip for indicating when an electronic tag reading device has identified an object said electronic tag is attached to, wherein said visual indication means is adapted to be activated when data received by said electronic tag matches data stored in said RFID chip.

6. The system as claimed in claim 5, wherein said plurality of objects are arranged in a stack, each object having a conductive surface in alignment with a conductive surface of a similar electronic tags attached to an adjacent object in said stack.

7. The system as claimed in claim 5, wherein said electronic tag is attached in a position adapted for transmitting power to stacked neighboring similar objects on which similar electronic tags are attached to, each said visual indication means being visible when said plurality of said objects are stacked.

8. The system as claimed in claim 5, wherein said electronic tag is embedded in an object.

9. The system as claimed in claim 5, wherein said plurality of objects are stackable, and adapted for arrangement side-by-side on a support device, said support device comprising:
 first and second conductive surfaces at respective first and second ends thereof, each said first and second conductive surface of said support device arranged for receiving power from an external AC power source, wherein said first conductive surface is in alignment with a respective said conductive surface of a first object of said stack adjacent said first end of said support device, and a second conductive surface is in alignment with a respective said conductive surface of a second object of said stack adjacent said second end of said support device, whereby power is capacitively coupled between each of said plurality of objects stacked on said support device.

10. The system as claimed in claim 9, wherein an object comprises one or more of a book, a CD or DVD.

11. The system as claimed in claim 5, wherein each said electronic tag further comprises:
 a second pair of conductive surfaces, said second pair of conductive surfaces being electrically connected, each conductive surface of said second pair of conductive surfaces adapted to form a half of a capacitor, the capacitor being formed when a conductive surface of said second pair is positioned adjacent a like conductive surface of a second pair of said similar electronic tag when said electronic tags are attached to neighboring objects.

12. A system for identifying an object of a plurality of objects comprising:
 for each object, an attached electronic tag adapted to be capacitively coupled with at least one similar electronic tag attached to an adjacent object, said electronic tag comprising:
 an RFID chip coupled to an antenna,
 an AC/DC converter for supplying power to said tag, and
 a first pair of conductive surfaces for connection with said AC/DC converter, a conductive surface of said first pair of conductive surfaces being adapted for receiving power from an external source and for powering said RFID chip, each conductive surface of said first pair of conductive surfaces being designed to form a half of a capacitor, the capacitor being formed when the conductive surface of said electronic tag is positioned adjacent a like conductive surface of said similar electronic tag when said electronic tags are attached to neighboring objects, wherein said formed capacitor functions to couple power to an electronic tag of a neighboring object; and,
 a second pair of conductive surfaces, said second pair of conductive surfaces being electrically connected, each conductive surface of said second pair of conductive surfaces adapted to form a half of a capacitor, the capacitor being formed when a conductive surface of said second pair is positioned adjacent a like conductive surface of a second pair of said similar electronic tag when said electronic tags are attached to neighboring objects; and, a visual indication means coupled to said RFID chip for indicating when an electronic tag reading device has identified an object said electronic tag is attached to, wherein said visual indication means is adapted to be activated when data received by said electronic tag matches data stored in said RFID chip, wherein said plurality of objects are adapted for arrangement side-by-side on a support device, said support device comprising:

first and second conductive surfaces at one end thereof arranged for receiving power from an external AC power source, said first conductive surface at said one end of said support device arranged in alignment with one conductive surface of said first pair of conductive surfaces of an object on said support device and forming a capacitor therewith, and a second conductive surface at one end of said support device arranged in alignment with one conductive surface of said second pair of conductive surfaces of said object and forming a capacitor therewith; and, a means for maintaining said plurality of objects in said side-by-side arrangement, said means including a mobile portion comprising two conductive surfaces in electrical connection, a first conductive surface of said two conductive surfaces arranged in alignment with one conductive surface of said first pair of conductive surfaces of an object on said support device and forming a capacitor therewith, and a second conductive surface of said two conductive surfaces arranged in alignment with one conductive surface of said second pair of conductive surfaces of said object and forming a capacitor therewith, whereby said two conductive surfaces in electrical connection form a current closing loop by being capacitively coupled with said electronic tag of said stacked object.

13. The system as claimed in claim 12, wherein said mobile portion of said maintaining means is spring loaded for maintaining said objects mobile portion in side-by-side arrangement with a stacked object.

14. A method for localizing an object among a set of objects in a stacked arrangement comprising:

a) providing for each object, an electronic tag adapted to be capacitively coupled with at least one similar electronic tag attached to an adjacent object, said electronic tag comprising:

an RFID chip coupled to an antenna, an AC/DC converter for supplying power to said tag, and a first pair of conductive surfaces for connection with said AC/DC converter, a conductive surface of said first pair of conductive surfaces being adapted for receiving power from an external source and for powering said RFID chip, each conductive surface of said first pair of conductive surfaces being designed to form a half of a capacitor, the capacitor being formed when the conductive surface of said electronic tag is positioned adjacent a like conductive surface of said similar electronic tag when said electronic tags are attached to neighboring objects, wherein said formed capacitor functions to couple power to an electronic tag of a neighboring object; and, a visual indication means coupled to said RFID chip for indicating the identification the object said electronic tag is attached to;

b) implementing an electronic tag reading device for providing data to said RFID chip;

c) comparing received data from said electronic tag with predetermined identification data stored at said RFID chip; and, d) activating said visual indication means when data received by said electronic tag matches data stored in said RFID chip.

15. The method for localizing an object as claimed in claim 14, further comprising:

implementing a support device for said set of objects;

said support device maintaining said set of objects in a stacked arrangement such that each object of said set of objects is capacitively coupled to an adjacent object of said stack for receiving power from said external source.

* * * * *